United States Patent
Porter et al.

[11] 3,874,480
[45] Apr. 1, 1975

[54] FRICTION BRAKE MECHANISM

[75] Inventors: Clyde R. Porter, West Los Angeles; Joseph A. Sember, Glendale, both of Calif.

[73] Assignee: P. L. Porter Co., Los Angeles, Calif.

[22] Filed: Apr. 3, 1972

[21] Appl. No.: 240,538

[52] U.S. Cl.................. 188/67, 188/77 W, 74/531, 192/81 R, 297/375
[51] Int. Cl........................................... B65h 59/10
[58] Field of Search............ 188/67, 77 W, 83, 1 R; 74/531; 192/81 R; 297/374, 375, 355

[56] References Cited
UNITED STATES PATENTS

| | | | |
|---|---|---|---|
| 2,429,383 | 10/1947 | Arens.................................... | 74/531 |
| 2,434,480 | 1/1948 | Anderson............................ | 188/1 R |
| 2,750,994 | 6/1956 | Howell, Jr............................ | 297/375 |
| 3,064,766 | 11/1962 | Hanizeski............................ | 188/77 W |
| 3,230,595 | 1/1966 | Kedem............................... | 192/81 R |
| 3,249,180 | 5/1966 | Torossian............................ | 188/67 |

FOREIGN PATENTS OR APPLICATIONS

| | | | |
|---|---|---|---|
| 580,153 | 7/1959 | Canada............................... | 188/67 |

*Primary Examiner*—Trygve M. Blix
*Assistant Examiner*—Edward R. Kazenske
*Attorney, Agent, or Firm*—William H. Pavitt, Jr.

[57] ABSTRACT

A hollow housing is provided with a rod which is slidably mounted within the housing. A tightly wound coil spring is positioned on the rod so that the inner diameter of the coil is in close contact with the periphery of the rod. An unlocking lever and a bushing are fixed relative to the housing, on either side of the coil spring, in such a manner that the rod may be slidably moved therethrough. The spring is fastened to the bushing and is located so as to unwind when the unlocking lever is actuated. When the lever is not actuated, movement of the rod in the direction from the lever toward the bushing may be prohibited by providing an angularly oriented surface on the bushing. When the rod is pushed, the spring will be reoriented from its natural angle of coiling to the angle on the bushing surface, tightly gripping the rod and preventing its movement. On the opposite side of the unlocking lever, a second coil spring may be tightly wound upon the rod in the opposite direction of coiling from the first spring. One end of the second spring may be fixed relative to a similar second bushing fixed in the housing. When the unlocking lever is rotated about the axis of the rod, it acts against the adjacent ends of the first and second springs to unwind the springs slightly, enlarging their inner diameters. The springs release their grip from the rod, allowing it to slide freely in either direction. The second bushing may be provided with a spring abutment face which is either perpendicular to the axis of the rod, causing the spring to act only as a friction drag when the rod is pushed, or may be angularly related thereto, causing the spring to act as a lock against rod movement in their direction. A third bushing having a spring abutment face which is perpendicular to the axis of the rod may be fixed within the housing in a similar fashion and a third spring fastened thereto. The opposite end of the third spring may be disengaged from all structure. The third spring and bushing will create a friction drag force on the rod which will prevent sudden relative movement between the rod and housing in either direction, whether or not the unlocking lever is actuated.

18 Claims, 4 Drawing Figures

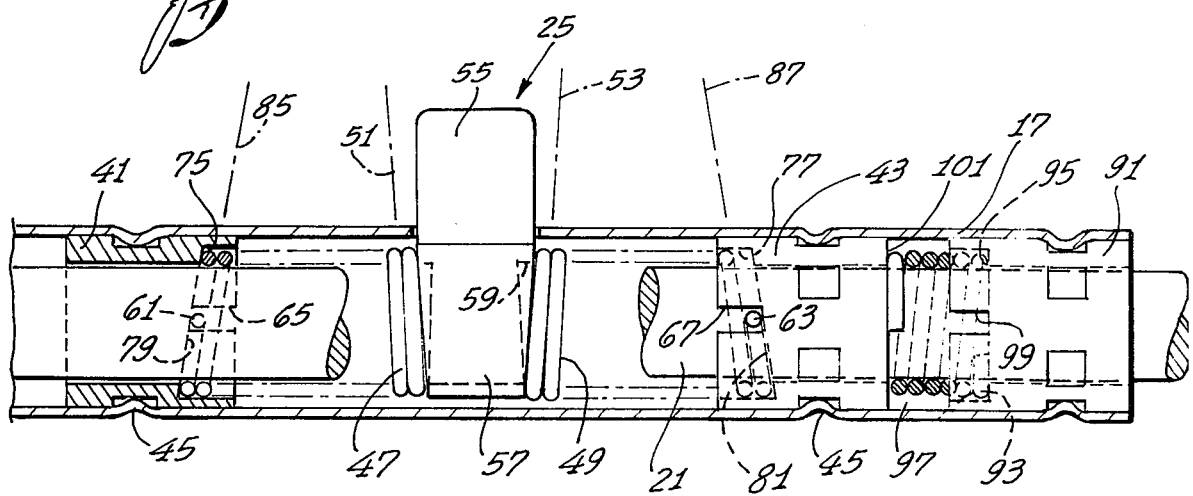
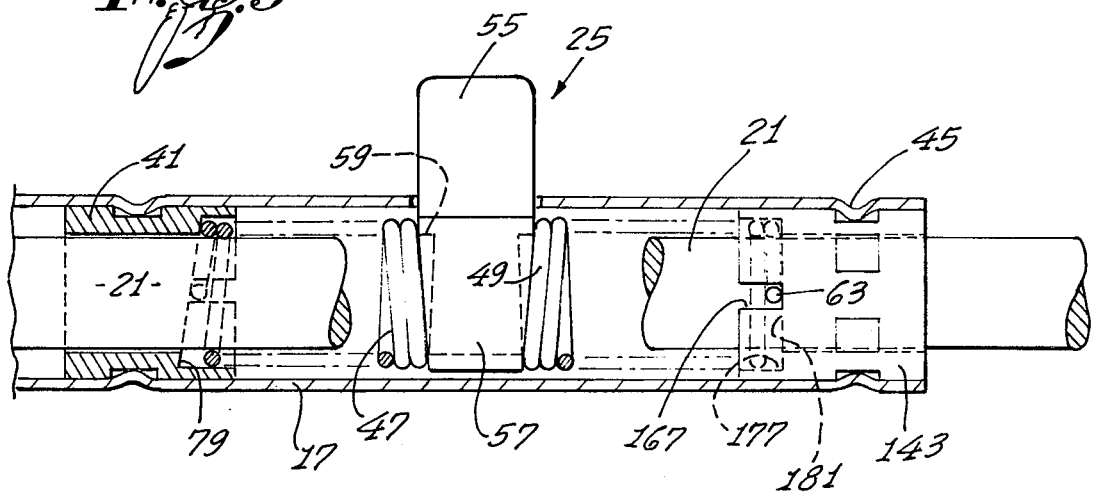

FRICTION BRAKE MECHANISM

BACKGROUND OF THE INVENTION

For many years, the concept of providing hardware for allowing a back support to be tilted or reclined relative to a seat has been used extensively in a wide variety of applications. For example, such reclining seats are commonly available in automobiles, buses, planes, etc.

In order to provide positive control of the back support movement, various devices have been developed which are normally locked to prevent inadvertent back support movement. These devices may be manually unlocked to allow adjustment of the back for the comfort of the person sitting down. A wide variety of such devices have been developed ranging from structures which merely allow the removal and replacement of a pin from coaxially located apertures to relatively complex structures utilizing hydraulic systems which may be operated from a remote source located on an arm of the seat.

At least one form of this type device which has been developed utilizes the principle of a coiled spring tightly wound upon a rod and positioned within a housing. One end of the spring is fixed within the housing. The rod may be attached to one of the relatively movable members, such as the back support, and the housing may be attached to the other member. i.e., the seat itself. In those devices, unlocking hardware is provided which, when actuated by a person sitting in the seat, will subject the second end of the spring to a force which causes its internal diameter to be increased. When the spring's diameter is thus enlarged, the rod can be moved through the housing in a relatively uninhibited manner.

A sleeve is located within the housing adjacent one end of the spring and is provided with a biased end-face against which the spring may be cocked when an attempt is made to move the rod through the housing toward the sleeve, with the unlocking hardware unactuated. Cocking of the spring against the bushing face will cause its inner diameter to be reduced slightly, resulting in an increase of the gripping force of the spring on the periphery of the rod, thereby prohibiting the movement of the rod through the housing.

This type of device has proven to be relatively unsatisfactory, however, since it comprises relatively complex unlocking hardward. Further, the prior art devices have been provided with a single spring and an unlocking level having a spring abutment edge which is perpendicular to the axis of the rod. Consequently, the single spring exerts a biasing force against the unlocking lever hardware, causing it to bind on the rod, inhibiting relative movement of the rod in the housing and causing wear of the rod. When the unlocking lever is actuated to unwind the coiled spring, the perpendicular face on the lever allows the spring to be cocked to an angle which is substantially perpendicular to the rod axis and allows free movement of the rod therethrough. However, when the lever is released, allowing the spring to return to its natural angle, the spring chatters against the rod causing noise and additional wear. The chattering of the spring also prevents the spring from becoming accurately seated on the rod to grip it as soon as the lever is released.

As the result of the tendency of the prior art devices to bind and become inoperable, and also as a result of the wear created by the lever binding and the spring chattering, the prior art devices have proven to be unacceptable for the use intended. Consequently, a need exists for the provision of a simple seat back adjustment mechanism which is substantially wear-free and which does not require frequent maintenance to alleviate binding and wear.

SUMMARY OF THE INVENTION

In general, the present invention relates to a friction brake for positively controlling the relative movement of two members and, as such, its applications in a variety of structures will soon become apparent to those skilled in the art.

More specifically, the invention relates to a friction brake for controlling the relative movement of a rod through a hollow housing. The brake mechanism comprises one or more coiled springs tightly wound on the rod and fixed against axial movement relative to the housing. Apparatus is provided for partially unwinding the springs, relaxing their grip on the rod and allowing the latter to be moved. On the other hand, if the rod is pushed before the springs are unwound, the latter will grip even more tightly to prevent the movement.

In one preferred environmental embodiment, the present invention may be used in a seat back adjustment and, for the sake of convenience, such an environment will hereinafter be assumed.

The present invention may be embodied by a first element, such as a tubular housing, relative to which a second element, such as a rod extending through the housing, may be moved to an infinite number of predetermined positions between predetermined limits.

In one preferred embodiment of the invention, one of the elements comprises a tubular housing and the other element comprises a rod which is positioned within the housing for limited slidable movement relative thereto. A plurality of bushings may be fixed within the housing by any suitable means, such as by staking, and the bushings serve to guide and position the rod in substantially coaxial relationship to the housing, regardless of the relative positions thereof.

Each of the bushings may be operatively associated with a tightly coiled spring wound upon the rod periphery so that the inner diameter of each spring is in frictional engagement with the periphery of the rod throughout the axial length of the spring. An unlocking lever may be so structured as to extend about the rod in such a manner as to be rotatable about the axis thereof. The coiled springs associated with the bushings most nearly adjacent the lever may be in close abutment with that portion of the lever extending about the rod and may be oriented, in terms of the helical angle, or direction of coiling, in opposite directions as the coils extend axially away from the lever.

In order to prevent cocking of the spring on either side of the unlocking lever when the latter is actuated, the spring seating surfaces of the lever may be provided so as to be angularly oriented, relative to the axis of the rod, at substantially the same natural helical angles as those of the adjacent spring coils. As a result, the springs cannot cock against the lever abutment edges either when the rod is moved therethrough or when the lever is actuated, thereby preventing the springs from chattering on the rod or creating wear.

The unlocking lever may be formed with a pair of abutment edges, each of which may act against the severed end surface of the spring adjacent thereto on either side of the lever. The distal or opposite ends of the springs may be removably fastened to the fixed bushings so that the far ends of the springs —from the unlocking lever—cannot be rotated relative to the housing. Consequently, when the unlocking lever is actuated so as to move its tabs against the adjacent spring coil ends, the springs will be motivated to unwind. In other words, the inner diameter of the coils will be increased and the coils will be withdrawn from contact with the rod periphery, allowing the rod to be freely movable therethrough.

The provision of a coil spring on each side of the lever allows the latter to be rotated about the axis of the rod against the force of the springs under a balanced force condition. Thus, the lever cannot bind against the rod, inhibiting the axial movement and/or causing wear.

In order to provide a clear understanding of the operation of a device formed in accordance with this invention, it will be understood that when movement of the rod is discussed, the direction of motion under consideration will always be from the unlocking or brake release lever toward the bushing and/or spring under discussion. It will also be understood that motion in the opposite direction, with the release unactuated, will not be prohibited by the spring between the bushing and the release, but it will be inhibited by that spring acting as a friction drag. Thus, if the rod is to be locked against axial movement in both directions, a spring and a predetermined type of bushing must be positioned on each side of the brake release lever.

Each of the bushings may be provided with a spring end coil abutment face which is properly oriented relative to the axis of the rod at a predetermined angle. If the abutment face is oriented relative to the rod axis at a predetermined acute angle, movement of the rod with the release unactuated will cause the coil spring to become cocked beyond a right angle relative to the rod axis and in the opposite angular direction from its normal angle of coiling to what shall be termed an unnatural helical angle. This will cause the spring to more tightly grip the rod and prevent its movement. On the other hand, if the end coil abutment face is perpendicular to the axis of the rod, the associated coil spring will act as a friction drag to inhibit, but not prohibit, movement of the rod relative to the spring when the unlocking lever is unactuated since it cannot be cocked to the unnatural helical angle.

As stated previously, a spring may be located on each side of the release lever in order that any actuating forces are evenly distributed and the lever does not bind on the rod. Since each spring must therefore be partially unwound as the lever is actuated, each must be provided with a means to fix its end distal from the lever against movement. In the preferred embodiment, the distal ends are each fixed in a bushing although they might, for example, either or both be fixed to the housing. if they are both fixed to bushings, and if the bushings are each provided with a spring abutment face at the unnatural helical angle, then each spring will act as a friction brake on the rod, for its respective movement direction, as it becomes cocked against its bushing face.

On the other hand, either or both bushing faces may be formed at a right angle to the rod axis and the associated spring will then act only as a friction drag for its respective direction of rod movement. Of course, in either case, when the unlocking lever is actuated, both springs will be unwound as previously described and the rod may be quickly and easily moved in either direction.

In order to prevent the coils immediately adjacent the unlocking lever from absorbing all of the unwinding force, and thus not increasing the inner diameter of the entire spring, a sleeve may be positioned over the springs so as to cause the transmission of the unwinding force throughout the entire lengths of the springs by preventing more than a predetermined amount of unwinding by any individual coil.

In some case, it may be desired to prevent rapid relative movement between the rod and housing even when the unlocking lever is actuated. For example, in the exemplary environment of a seat with a movable back support, it would not be desirable to actuate the brake release lever and allow the back support to fall backward with a sudden force. In order to prevent such an occurrence, a third bushing, having a spring end coil abutment face perpendicular to the axis of the rod, may be fixed within the housing and one end of a coiled spring may be fixed thereto, although it need not be so fixed, if desired. The opposite end of this third spring may be disengaged from all structure except insofar as it is tightly wound upon the rod. Thus, even when the unlocking lever is actuated, the third spring will create a friction drag force on the rod in both directions which will inhibit but not prohibit the movement thereof.

When a coiled spring is used as a friction drag force device, either when the release is unactuated or as described with respect to the third spring, if more friction drag force is required the drag force spring or springs may be replaced by coiled springs having a greater number of coils. This will create a higher drag force as a result of the increase in the area of frictional contact between the spring and the rod. In other words, the frictional contact, either for braking or for drag, is directly proportional to the axial length of the spring, given the same size spring wire thickness and coil diameter.

Thus it can be seen that the present invention, in its most complex form, might comprise a housing, a rod, three bushings, three coiled springs, an unlocking lever, and a sleeve. It will be realized by those skilled in the art that if some of the functions of the device are unnecessary in certain environments, a portion of the structure can be eliminated. However, those skilled in the art will also realize that even in its most complex form, the structure of this invention is substantially less complicated and costly than those found in the prior art, while producing a vastly improved result.

From the above discussion and the following Detailed Description, taken together with the accompanying drawings, it will also be understood that the present invention eliminates the deficiencies found in the prior art and provides additional advantages. Additional objects as well as various alternate embodiments and modes of the present invention will now become apparent to those skilled in the art without exceeding the scope or concepts of the present invention as defined in the claims.

BRIEF DESCRIPTION OF THE DRAWINGS

FIG. 2 is a view of the device shown in FIG. 1, partly broken away, as seen along a line II—II;

FIG. 3 comprises a view, similar to FIG. 2, of an alternate embodiment of the invention.

DETAILED DESCRIPTION

Figure 1:
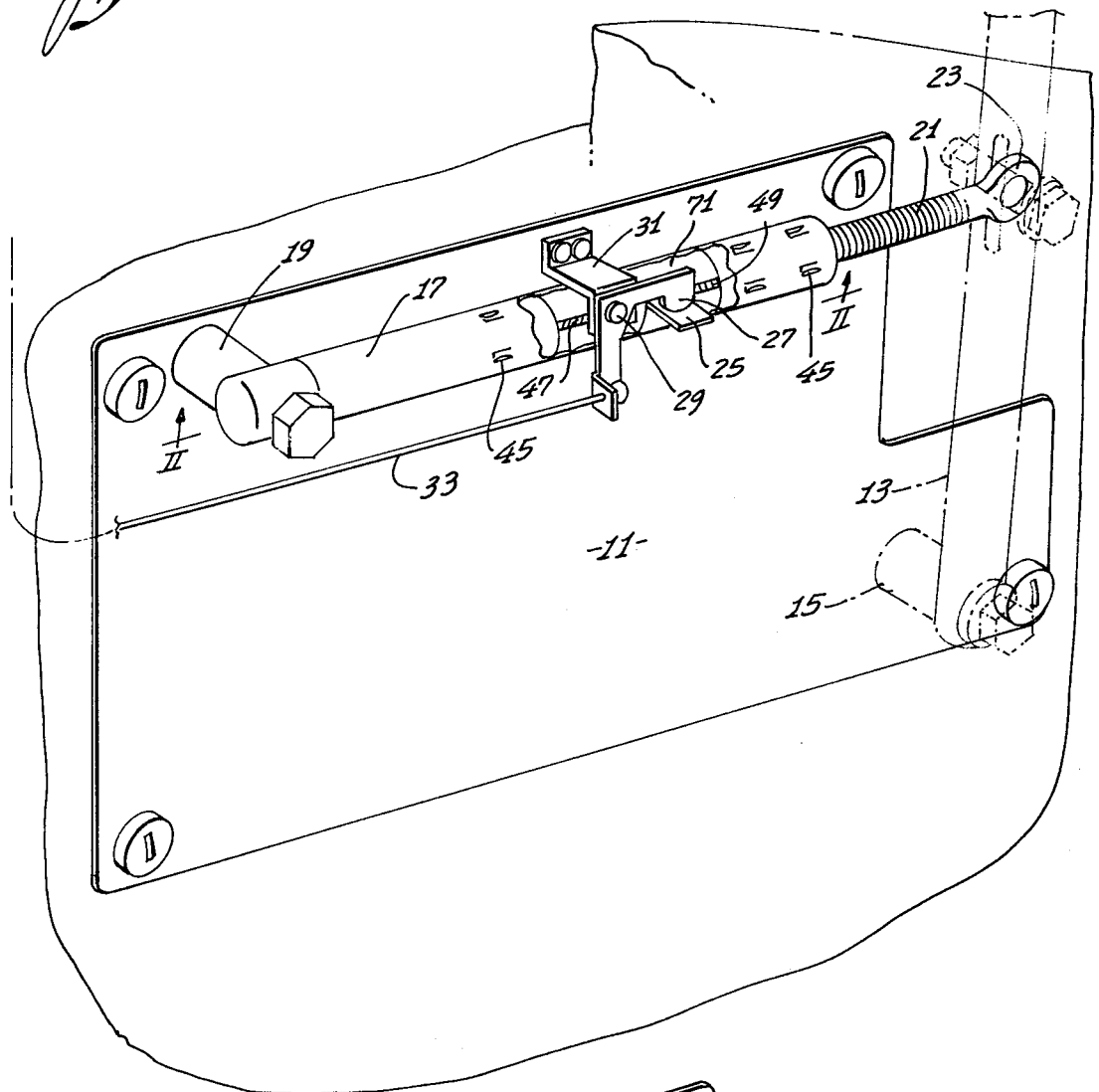
FIG. 1 comprises an isometric view of a friction brake mechanism in accordance with the present invention, partly broken away for clear illustration of a portion thereof.

As stated previously, the present invention can be utilized in any instance in which it is desired to control the relative movement between two objects so as to position them at one of an infinite number of positions within a predetermined range. As an exemplary embodiment, however, in FIG. 1 the two elements which are relatively movable comprise a chair-seat having a plate 11 suitably attached to its side and a seat back from which a pair of arms, one of which is shown at 13, extend so as to pivot about a point 15 and thus be adjustable for the comfort of the person in the seat.

In this exemplary embodiment, a housing 17 may be pivotally mounted on one of the elements, such as the seat or plate 11 at a pivot point 19, so as to be freely movable about that pivot when the seat back is adjusted. A rod 21 may be similarly pivotally attached to the arms 13, such as by an eye 23 formed at the rod end.

An unlocking lever 25, for use in a manner to be described below, may be extended through the housing in the manner shown for actuation by any suitable means to release the friction gripping or braking device acting between the housing and the rod. When it is released, the rod may be extended from or retracted into the housing, much the same as a piston rod might be partially retracted or extended from a cylinder. In this simplified embodiment, however, an oscillating actuator 27 may be pivoted about a point 29 supported by a brace 31. The actuator 27 may be operated by a person sitting in the seat via a cable or similar device 33. Thus, when the seat occupant takes some action to transmit a force through the element 33, the actuator 27 can be pivoted about the pivot point 29 to press against the unlocking or brake release lever 25 for the purpose to be described.

Referring now to FIG. 2, a pair of bushings 41 and 43 may be suitably located in the housing and fastened thereto by any desired method, such as by being staked thereto as illustrated at 45. Thus, the bushings are fixed against motion in any direction relative to the housing. Bushings 41 and 43 may be located at substantially equal distances on either side of the lever 25. Coiled springs 47 and 49 may be located between the lever and the bushings. A careful review of the figure will clearly reveal that in this embodiment, the springs 47 and 49, as shown in full lines, are tightly wound in opposite directions so that each achieves what shall be termed a natural helical angle relative to the axis of the rod 21, the angle being accentuated by the lines 51 and 53.

Figure 4:
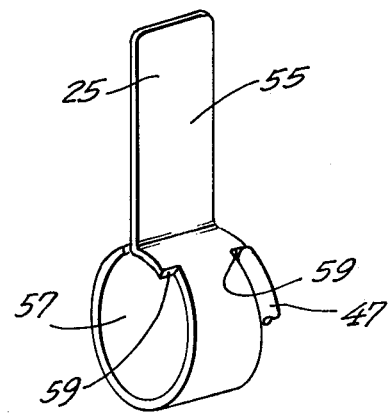
FIG. 4 is a perspective view of a brake release lever which may be used in the present invention, as seen from the rear of FIGS. 2 or 3.

As shown in FIG. 4, one form of the brake release or unlocking lever is shown having an actuator-control extension 55 integral with a circular body 57. Body 57 is structured so as to have a diameter which allows the rod to freely pass therethrough. A portion of the body may be cut away on each side thereof along the natural helical angle of the adjacent spring to form spring seats which terminate at abutment edges 59. Thus, if the springs are properly cut, the ends thereof will be in opposed relationship to the abutment edges 59 so that, when the lever is actuated to rotate the body 57 about its axis, the abutment edges 59 will push against the ends of the springs 47 and 49, tending to unwind them.

As shown in FIG. 2, the distal ends 61 and 63 of the springs may be bent at right angles to the axis of the spring and positioned within slots 65 and 67 in the bushings 41 and 43 respectively. Alternatively, the distal ends may be fixed within the housing 17. Thus, when the lever 25 is actuated, the distal ends 61 and 63 cannot be moved about the axis of the rod and the force imparted to the springs by the lever will cause them to unwind.

It can thus be seen that the springs are tightly wound upon the periphery of the rod so that, when fully wound, they grip the rod and are immovable relative thereto. The actuation of the lever 25 will cause the springs to become partially unwound and release their grip on the rod as the edges 59 push against the free ends of the coils located against the seating surfaces. As shown in FIG. 1, in order to prevent the coils nearest the lever from absorbing all of the unwinding force, thereby preventing the spring from completely releasing the rod, a sleeve 71, having a slot extending parallel to the axis thereof, may be positioned over the springs between the bushings 41 and 43. The lever 25 may extend through the slot in the sleeve 71, and the sleeve may, if desired, be formed so as to fit over the springs with a slightly loose tolerance. Thus, the sleeve can rotate about the springs when the lever is actuated but may be close enough to the outer periphery of the springs to prevent non-uniform expansion of the coils thereof.

The provision of the springs 47 and 49 on the opposite sides of the lever 25, will allow the lever to be actuated with a balanced reaction force on each side thereof. Consequently, as the lever is rotated about the axis of the rod, the body 57 will not be able to bind against the rod and thus will not wear the rod or be inhibited by it during the rotation. Since the seating surfaces of the lever body 57 are formed at the same angles as the natural halical angles of the adjacent springs, actuation of the lever 25 will not cause the springs to become cocked away from their natural helical angle anywhere along their lengths. Consequently, when the actuating force on the lever is released, the springs will immediately go back to their gripping positions on the rod without any chattering or undesirable wearing.

In the embodiment illustrated in FIG. 2, each of the bushings 41 and 43 are provided with a counterbore 75 and 77, respectively, into which the coils adjacent the distal end of each spring may be seated. The bottom of the bores 75 and 77 are provided with tapered surfaces or spring seats 79 and 81, respectively. Referring again to the phantom line 51 designating the natural helical angle of spring 47, it will be seen that the bottom 79 of the bushing bore 75 may be formed at an angle, designated by the line 85, which is on the opposite side of a perpendicular to the spring axis. As a result, when the lever 25 is unactuated and a force is exerted tending to move rod 21 from right to left, as seen in the figure, spring 47 will be cocked against the bottom 79 of the bushing bore and assume what will be designated as an unnatural helical angle. As a result, the spring will exert a tighter gripping force against the rod 21 and prevent its movement in that direction.

On the other hand, when a force is exerted to move the rod from left to right, and the lever 25 is unactuated, spring 47 will maintain its natural helical configuration as a result of the orientation of its seating surface of the lever body 57.

Spring 49 may cooperate with the similar bottom configuration 81 of the bushing bore 77 to similarly prevent movement of the rod toward the right as spring 49 becomes cocked into the unnatural helical angle illustrated by the line 87. In other words, with a configuration of the type illustrated in FIG. 2, the spring 47 will prevent the rod from being moved toward the left when the lever 25 is unactuated and, under the same conditions, the spring 49 will prevent the rod from being forced to the right.

Thus, with this structure, a positive friction brake or lock is provided which prevents relative movement between the rod and housing unless the lever is actuated, utilizing only a simple spring force to grip and hold the rod. At the same time, the lever will be actuated with uniform loading on each side thereof so that it will not tend to bind against the rod, which could cause wear and inhibit motion. At the same time, the configuration of the lever and its cooperation with the natural helical angles of the spring on either side thereof will prevent the springs from chattering against the rod when the lever is released.

In some instances, it may be desirable to prevent the rod and housing from being moved relative to one another, even when the lever 25 is actuated, unless a predetermined force is being exerted on the relatively movable elements controlled by such a friction brake. In such an instance, a third bushing 91 may be similarly fastened within the housing 17. The third bushing may also be provided with a spring-receiving bore 93 which ends at a bottom 95 which may be either perpendicular to the axis of the rod as illustrated, or, if desired, may be formed at an angle which is substantially the same as the natural helical angle of a spring 97. As illustrated in the drawing, the spring 97 may tightly grip the rod, but its ends are not attached to any structure. If desired, however, the end of the spring within the bore 93 may be located within a slot 99, but such an expedient will, in many cases, be unnecessary. In any event, no unwinding force will be exerted on the spring so that, when the rod is moved in either direction after the lever is actuated, the friction gripping of the spring 97 on the rod will continue to be exerted. Consequently, the rod can be moved relative to the housing but a force must be exerted thereon which exceeds the frictional gripping force of the spring 97. In order to ensure that the spring 97 cannot travel with the rod, the end thereof which is not seated within the bore 93 merely abuts the rear edge 101 of the bushing 43.

It will now be realized by those skilled in the art that the friction gripping force exerted on the rod 21 by the spring 97 will be directly proportional to the axial length of the spring. Thus, if a large force must be exerted before the rod and housing can be moved relative to one another, the spring 97 can be replaced by a similar spring having a longer axial length.

In the described environment, the spring 97, acting as a constant force friction drag, will prevent sudden, uncontrolled movement, such as the seat back falling backward, when lever 25 is actuated. Of course, it will be realized that if such a friction drag is not desired, the spring 97 and the bushing 91 may be eliminated entirely.

Referring now to FIG. 3, those elements which are substantially identical to the elements illustrated in FIG. 2 have been provided with identical numerical designations and no further description thereof is necessary. In this embodiment, a bushing 143 may be provided having a bore 177 ending in a bottom surface 181. Surface 181 may be substantially perpendicular to the axis of the spring 49 and rod 21. The distal end 63 of the spring 49 may be captured within a slot 167 in the bushing to prevent rotation of the spring about the axis of the rod when the lever 25 is actuated in the manner previously described. It wil be recalled from the description of the embodiment in FIG. 2 that, if the spring 49 could be cocked over to the unnatural helical angle, the spring would more tightly grip the rod and prevent its movement toward the right. However, when the bottom of the bushing bore is formed so as to be perpendicular to the axis of the rod, as illustrated in FIG. 3, a force exerted on the rod to tend to move it toward the right as seen in the drawings, will cause the spring 49 to cock from the natural helical angle to an angle which is substantially perpendicular to the spring axis, This latter angle is illustrated by the spring coils shown within the bore 177. In other words, spring 49, when used with the bushing 143 will not prevent movement of the rod toward the right, but will merely serve to balance the reaction forces exerted on the lever 25 during actuation. Consequently, the embodiment illustrated in FIG. 3 will prevent the rod from being forced to the left due to the reaction of spring 47 unless the lever is actuated, but will not prevent movement of the rod to the right, even though the lever is not actuated. However, when the rod is thus being forced to the right, spring 47 will act as a friction drag to impede the movement.

Thus it has been illustrated that a friction brake may be formed in accordance with the present invention in a very simple embodiment by the use of coiled springs and bushings having various seating surfaces against which springs may be moved. Any combination of the features illustrated may be utilized as desired in any given instance. For example, the embodiment illustrated in FIG. 3 could also be provided with the friction drag structure of spring 97 and bushing 91. It will also be realized by those skilled in the art that the present invention may be utilized in a wide variety of structures which, in some instances, may bear little or no physical resemblance to the illustrated embodiments. However, even those structures will not excess the scope of the present invention so long as they are within the scope of the following claims.

We claim:

1. A friction brake for selectively preventing relative axial motion between a cylinder and a rod therein comprising
  a pair of springs tightly and oppositely wound upon said rod along intersecting natural helical angles.
  a pair of bushings fixed in said cylinder for guidance of the rod therethrough, each having means therein for fixing one end of one of said springs, operative means for enlarging the coils of said springs to provide a clearance between them and said rod including means for enlarging both of said springs simultaneously without substantial alteration of the natural helical angles thereof comprising actuatable means extending substantially about said rod and having a spring seat means extending along each side thereof against each of which one of said springs is seated on its natural helical angle and a spring abutment means adjacent the end of each of said spring seats, and means closely fitting about said springs and movable with said enlarging means for ensuring the uniform expansion of the coils of the springs throughout the lengths thereof.

2. The brake of claim 1 wherein
said pair of bushings each include
spring seat means against which the spring fixed to each said bushing may be cocked to an unnatural helical angle by axial movement of said rod when an axial force is exerted on said rod and said enlarging means is not actuated.

3. The brake of claim 1 including
constant force friction drag means to prevent relative motion between said cylinder and said rod unless a predetermined force is exerted therebetween comprising
a spring means tightly wound upon said rod and
means to prevent axial movement of said spring means relatively to said housing.

4. A friction brake for prohibiting axial movement of a rod comprising
first means relative to which said rod may be axially moved,
an actuating means rotatable about the axis of the rod and axially fixed relative to said first means,
a pair of springs, oppositely wound and tightly coiled along intersecting natural helical angles on said rod, one on each side of said actuating means and each located so as to be simultaneously partially unwound by said actuating means upon partial rotation thereof about the axis of the rod without substantial alteration of the helical angles thereof, and
means fixed relative to said first means for fixing the distal ends of said coiled springs to prevent movement thereof when said springs are partially unwound by said actuating means.

5. The friction brake of claim 4 wherein
said fixing means include
spring seat means against which the spring adjacent thereto may be cocked to an unnatural helical angle when a force is exerted on said rod, tending to move it axially from said actuating means toward said fixing means, and said actuating means is not partially rotated about the axis of the rod.

6. The brake of claim 4 including
means closely positioned about said pair of springs and movable about the axis of the rod to ensure uniform partial unwinding throughout the length thereof when partially unwound by said actuating means.

7. The brake of claim 4 including constant force friction drag means fixed between said rod and said first means to prevent relative movement therebetween unless a predetermining movement force is exerted thereon.

8. The brake of claim 4 wherein
said actuating means include
means for preventing said pair of springs from being cocked substantially out of their said natural halical angles.

9. A friction brake comprising
a housing,
a rod axially movable with said housing,
a plurality of bushings fixed within said housing through which said rod may be slidably moved,
a release lever mounted within said housing intermediate two of said bushings,
a coiled spring tightly wound upon said rod intermediate said release lever and each adjacent bushing, said springs each being oppositely wound on intersecting natural helical angles and each being fixed at one end thereof at said bushing adjacent thereto,
means on said release lever for simultaneously partially unwinding both of said springs, and
means movably mounted, within said housing in close relationship with both of said springs throughout a major portion of their circumferences for ensuring uniform diametrical enlargement of said springs.

10. The brake of claim 9 wherein
at least one of said bushings includes
a spring abutment face which is perpendicular to the axis of the adjacent spring.

11. The brake of claim 9 wherein
at least one of said bushings includes
a spring abutment face which is formed at an unnatural helical angle relative to the axis of the adjacent spring.

12. The brake of claim 9 wherein
at least one of said bushings includes
means for abutting the adjacent spring at an unnatural helical angle when the adjacent spring is cocked thereagainst by attempted movement of said rod relative to said housing when said release lever is unactuated.

13. The brake of claim 9 including
spring means similarly mounted on said rod on the side of one of said bushings distal from said actuating lever and
means for preventing movement of the latter spring means relative to the axis of said housing.

14. The brake of claim 9 including
constant force friction drag means located within said housing to prevent relative motion of said rod and housing unless a predetermined motivation force is exerted when said release lever is actuated.

15. A friction brake for selectively preventing relative axial motion between a cylinder and a rod therein comprising
a pair of springs tightly wound along intersecting natural helical angles upon said rod,
a pair of bushings fixed in said cylinder for guidance of the rod therethrough, each having g
means therein for fixing one end of one of said springs and
spring seat means against which the spring fixed to each said bushing may be cocked to an unnatural helical angle by axial movement of said rod when an axial force is exerted on said rod and said enlarging means is not actuated, means for enlarging the coils of said springs to provide a clearance between them and said rod including means for enlarging said springs without substantial alteration of the natural helical angles thereof comprising actuatable means extending substantially about said rod and having a spring seat means on either side thereof against each of which one of said springs is seated on its natural helical angle and a spring abutment means adjacent the end of each spring seats, and means for ensuring the uniform expansion of the coils of the springs throughout the lengths thereof.

16. A friction brake comprising a housing, a rod releasably fixed in said housing for selective axial movement relative thereto, an actuating means within said housing substantially encircling said rod, extending exteriorly of said housing, and having a pair of spring seats on opposite axial ends thereof formed at the intersecting natural helical angles of coil springs positioned thereagainst and means for biasing such coil springs to simultaneously enlarge the internal diameters thereof upon rotation of said actuating means about the axis of said rod, said biasing means being located adjacent a termination of each said spring seats, a pair of coil springs oppositely wound about said rod along intersecting natural helical angles, sealed on said spring seats, and terminating at a first end adjacent said biasing means, and means for fixing the second end of each said coil spring relative to said housing.

17. The friction brake of claim 16 including means substantially completely encircling said springs and movable by said actuating means for ensuring uniform internal diameter enlargement throughout the axial length of each of said coil springs upon rotation of said actuating means.

18. The friction brake of claim 16 including third coil spring means wound about said rod, and means for preventing axial movement of said third coil spring relative to said housing.

* * * * *